United States Patent [19]

Gaudino et al.

[11] Patent Number: 4,844,998
[45] Date of Patent: Jul. 4, 1989

[54] BIPOLAR SILVER OXIDE-ALUMINUM ELECTRODE

[76] Inventors: Larry J. Gaudino, 1705 Dunleith Way; Chi H. Leung, 3704 Hobbs Rd., both of Greensboro, N.C. 27408

[21] Appl. No.: 208,434

[22] Filed: Jun. 20, 1988

[51] Int. Cl.$^4$ .............................................. H01M 4/34
[52] U.S. Cl. .................................... 429/210; 29/623.5
[58] Field of Search ................ 29/623.1, 623.3, 623.5; 419/38, 65; 429/210, 219, 119; 252/182.1

[56] References Cited

U.S. PATENT DOCUMENTS

| | | | |
|---|---|---|---|
| 3,953,239 | 4/1976 | Anderson | 429/120 |
| 4,091,184 | 5/1978 | Erisman et al. | 429/210 X |
| 4,107,406 | 8/1978 | Modem et al. | 429/218 |

*Primary Examiner*—Anthony Skapars
*Attorney, Agent, or Firm*—Armstrong, Nikaido, Marmelstein, Kubovcik & Murray

[57] ABSTRACT

A unified bipolar electrode comprises an aluminum anode, a silver separator foil bonded thereto and a cathode comprised of a layer of porous battery grade silver power. The cathode is bonded to the silver separator by means of an adhesive layer of fine silver powder and glass frit therebetween.

5 Claims, No Drawings

BIPOLAR SILVER OXIDE-ALUMINUM ELECTRODE

This invention concerns batteries utilizing aluminum anodes and silver oxide cathodes. Such batteries are disclosed in U.S. Pat. No. 3,953,239. The invention is particularly concerned with a method of making the electrodes for such batteries.

In this invention a silver cathode, a silver separator foil and an aluminum anode are bonded together to form a unified bipolar electrode. The silver separator and aluminum anode are first bonded together such as by roll bonding or else by plating or plasma spraying silver on the aluminum. The silver cathode is then made by coating the silver separator with a layer of an adhesive thick film paste containing fine silver powder and low melting glass frit and the pressing onto the adhesive layer a layer of battery grade silver powder of proper morphology to provide porosity in the silver cathode.

In one example, the anode material was high purity aluminum containing small amounts of gallium and magnesium. Such an aluminum is disclosed in U.S. Pat. No. 4,107,406. Starting material thickness was 96 mils for the aluminum and 9 mils for the silver separator sheet. Both materials were fully annealed, cleaned and wire brushed to remove oxide layers. The materials were then bonded together by roll bonding to a final thickness of 23 mils for the anode and 2 mils for the silver separator, and were then cut into a desired electrode shape. Next, a 0.75 to 1.25 mil thick layer of an adhesive thick film paste was applied to the silver separator. The paste comprised 70 to 85% of fine silver powder, the balance of the solids being a finely powdered glass frit having a low melting temperature, the paste also containing liquid binder and solvent to provide paste consistency. A layer of battery grade silver powder, about 1 to 2 mm thick, was then applied to the uncured thick film paste. The battery grade silver powder disclosed in U.S. Pat. No. 4,753,782 could be used. The layer of battery grade silver powder was then pressed to a green density not exceeding 4.5 grams/cc in order to not impair or deleteriously affect the porosity. The bipolar plates were then sintered in dissociated ammonia at temperatures less than the melting temperature of the aluminum cathode material, but above the melting temperature of the glass frit, say, at about 400° to 560° C. for less than 60 minutes. The strengthened bipolar plates are then anodic oxidized in an aqueous alkaline electrolyte to convert the silver in the cathode to the desired divalent oxide (AgO) form. The charged bipolar plates can then be pile stacked into a battery casing.

I claim:

1. The method of making a unified bipolar electrode comprising the steps of bonding an aluminum anode to a silver separator foil, depositing on the silver separator foil a layer of a thick film paste comprised of fine silver powder and low melting glass frit, pressing onto the paste layer a layer of battery grade silver powder to a green density not exceeding 4.5 grams/cc in order to not impair porosity of the battery grade silver powder, and sintering the combination of aluminum anode, separator foil and battery grade silver powder layer at a temperature below the melting temperature of the aluminum anode but above the melting temperature of the glass frit.

2. The method of claim 1 wherein the thickness of the thick film paste layer is about 0.75 to 1.25 mils.

3. The method of claim 1 wherein the thickness of the layer of battery grade silver powder is about 1 to 2 millimeters.

4. The method of claim 1 wherein the combination is sintered at a temperature of about 400° to 560° C.

5. A unified bipolar electrode comprising a silver separator foil bonded to an aluminum anode, a thick film layer comprised of fine silver powder and low melting glass frit on the silver separator, and a cathode comprising a layer of battery grade silver powder on the thick film layer and bonded thereto by means of having been sintered at a temperature above the melting temperature of the glass frit.

* * * * *